Feb. 11, 1969   R. F. WHITE ET AL   3,427,051
FLUID PRESSURE COUPLING
Filed Feb. 24, 1967
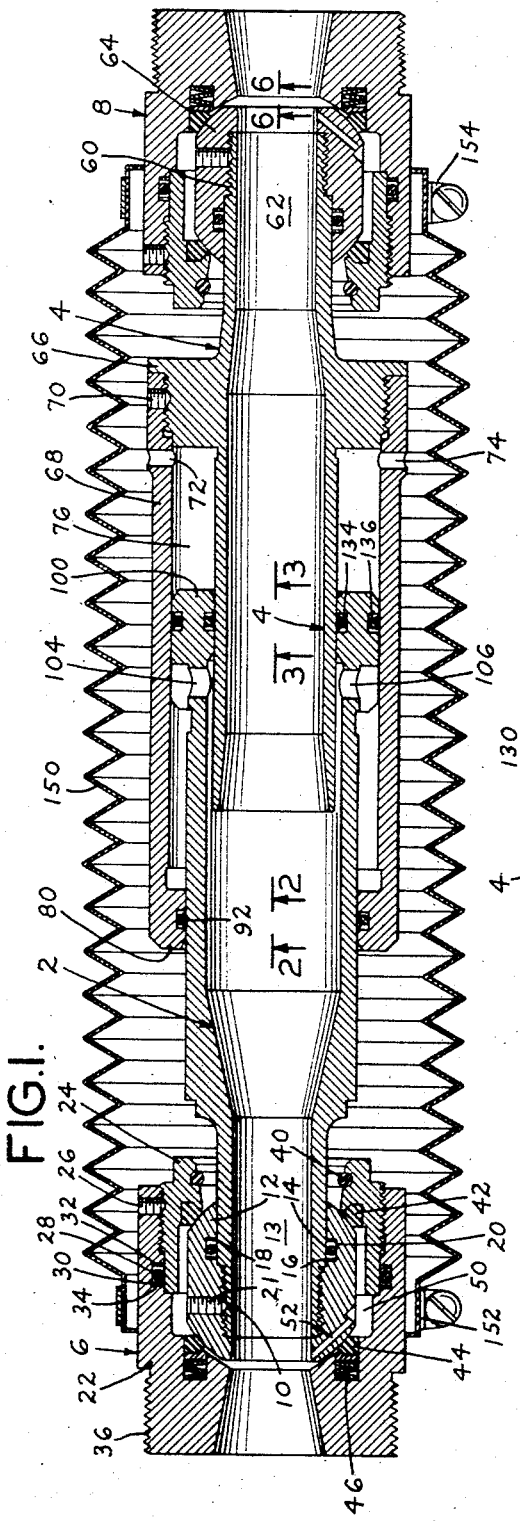

United States Patent Office 3,427,051
Patented Feb. 11, 1969

---

3,427,051
FLUID PRESSURE COUPLING
Robert F. White, Westerly, R.I., and Roger M. Wright, Old Lyme, Conn., assignors to General Dynamics Corporation, New York, N.Y., a corporation of Delaware
Filed Feb. 24, 1967, Ser. No. 618,506
U.S. Cl. 285—165                                        10 Claims
Int. Cl. F16l 27/12

ABSTRACT OF THE DISCLOSURE

A fluid pressure coupling is provided with ball joints with a telescoping center section to make the pressure coupling flexible in three degrees of freedom. A seal is provided for the telescoping center sections having several radial grooves around the inner side of the seal and at least one axially extending groove interconnecting the grooves to pressure from the high pressure end, so that only one land of the seal is continuous around the circumference of the seal.

---

The invention herein described was made in the course of a contact with the U.S. Navy.

The instant invention relates to fluid pressure couplings and, more particularly, to flexible and expandible fluid pressure couplings.

It is often desirable to connect a fluid pressure inlet fitting to a fluid pressure outlet fitting where at least one of the fittings is movable, to a limited extent, relative to the other because of vibration, expansion, mounting, or for a variety of reasons. One means commonly employed to make such a connection is a resilient hose fitted at its opposite end, with suitable couplings for connection to the fluid pressure inlet and outlet, respectively. Such a resilient hose may be rubber or a plastic and, usually, is reinforced with suitable reinforcement.

Resilient hoses, while satisfactory in some installations, are not satisfactory in others. Due to vibration and continual movement and flexing of such hoses, such hoses often fail and, when failure occurs, the hoses rupture and fluid presure and fluid is lost. Where the fluid is under high pressure, substantial damage can result from the ruptured hose. Even without failure, when such hose is used at high pressure, the pressure in the hose stiffens the hose and, if the pressure is sufficiently high, the coupling becomes rigid.

In many installations, especially high pressure installations, it is difficult to anticipate a rupture or failure of such a coupling. Until the hose ruptures, or fails, the hose appears to be in serviceable condition. Once it starts, failure progresses rapidly and little opportunity is afforded for replacement before failure is complete and the resulting damage has occurred.

Attempts have been made, heretofore, to provide flexible and expandable fluid pressure couplings made up of non-resilient members. These attempts, however, have met with limited success. In some instances, the couplings of non-resilient members have been cumbersome, expensive and difficult to install. In others, the couplings have not been sufficiently flexible or, where initially flexible, lose their flexibility after short periods of use at high pressure.

One of the objects of the instant invention is to provide an improved fluid pressure coupling.

A further object is to provide such a coupling made up of non-resilient members.

A still further object is to provide such a coupling that, when operated at high pressure, will retain its flexibility.

Still a further object is to provide an improved seal for sealing the non-resilient sections of such a coupling.

These and other objects will be more apparent from the following description and attached drawings in which:

FIG. 1 is a side elevational view, in section of the preferred form of the coupling of the instant invention;

FIG. 2 is an enlarged view, in section, taken along the line 2—2 of FIG. 1;

FIG. 3 is an enlarged view, in section, taken along the line 3—3 of FIG. 1;

FIG. 4 is a view, in section, taken along the line 4—4 of FIGS. 2 and 3;

FIG. 5 is a view, in section, taken along the line 5—5 of FIG. 3; and

FIG. 6 is an enlarged view, in section, taken along the line 6—6 of FIG. 1.

Referring to the drawings, a pair of telescoped and relatively movable fluid pressure conduits 2, 4, of non-resilient material, are connected at their ends to ball and socket joints, generally designated 6, 8. In the illustrated embodiment, ball and socket joints 6, 8 are identical and only one of the joints will be described, it being understood, however, that the other joint is of the same construction.

End 10, of conduit 2, is threaded into cooperating threads in fluid passage 13 of ball 14 of joint 6. An O ring 14, having, at its opposite sides, spiral washers 16, 18, is positioned in recess 20 of ball 12 forming a fluid tight seal between conduit 2 and ball 12. Set screw 21, in ball 12, engages threaded end 10 of conduit 2, locking the conduit to ball 12.

Ball 12 of joint 6, is mounted in socket housings 22, 24. Socket housing 24 is threaded into housing 22 and locked therein by set-screw 26. O ring 28, having, at its opposite sides, spiral washers 30, 32, is positioned in recess 34, in housing 22, forming a fluid tight seal between the assembled housings. Housing 22 is threaded at 36 for connection to a fluid pressure inlet, or outlet, as the case may be, not shown.

Ball 12 of joint 6 is mounted for limited movement in socket housings 22, 24, the forward end of housing 24 having a resilient O ring 40 which, when conduit 2 reaches the limit of angular movement in the housings, cushions conduit 2, preventing damage to the conduit and housing. Ball 12 is supported, for angular movement in the housings, by seat seal 42, mounted in a suitable recess in housing 24, and seat seal 44, mounted in a similar recess in housing 22. Seat seals 42, 44 are maintained in sealing contact with ball 12 by Belleville springs 46 mounted in housing 22 behind seal 44. The materials from which the seat seals 42, 44 are made should be chosen with particular care. Materials such as those described in U.S. Patent 2,989,990 have been found to be especially useful in these seals.

Chamber 50, between the opposing walls of ball 12, housings 22, 24 and seals 42, 44, extends circumferentially around ball 12 and is connected to fluid passage 13 by port 52, the fluid pressure in passage 13 and chamber 50 being balanced by interconnecting port 52 during operation of the couplings.

The threaded end 60 of conduit 4 is threaded into cooperating threads in fluid passage 62 of ball 64 of joint 8. Conduit 4, at its end opposite that threaded into ball 64, telescopes into the free end of conduit 2. Intermediate its threaded and free ends, conduit 4 has an outwardly extending shoulder 66 threaded at its circumference. Sleeve 68 is threaded, at one of its ends, onto the threads on shoulder 66 and is locked in place thereon by set-screw 70. Adajcent shoulder 66, sleeve 68 has fluid passages ports 72, 74 passing through the wall of the sleeve and connecting chamber 76, formed between the inner wall of sleeve 68 and the outer wall of conduit 4, with the atmosphere. The purpose of ports 72, 74 will be apparent from the later description.

Inwardly projecting flange 80, at the telescoped end of conduit 4, extends around conduit 2 forming a closure between the outer end of sleeve 68 and conduit 2, with clearance 81 therebetween. Groove 82 extends circumferentially around the inner periphery of flange 80, groove 82 having axially spaced radial walls 84, 86 interconnected by axially extending wall 88. Sealing ring 90, in groove 82, extends circumferentially around conduit 2 in sliding, sealing contact therewith, resilient O ring 92, in groove 86, applying a resilient force to the back of sealing ring 90 and forming a fluid-tight seal behind ring 90, as later described.

At its free or telescoped end, conduit 2 telescopes over the end of conduit 4 and into and along the inner wall of sleeve 68. At is telescoped end, conduit 2 has a flange 100 extending radially inwardly and outwardly from conduit 2. At its inner periphery, flange 100 is spaced from the outer wall of conduit 4 by clearance 101 and, at its outer periphery, is spaced from the inner wall of sleeve 68 by clearance 103. Clearances 101, 103 allow conduits 2, to telescope with conduit 4 and sleeve 68 as will be described. Fluid pressure passages 104, 106 extend radially through the wall of conduit 2, connecting the chamber intermediate the outer wall of conduit 2 and the inner wall of sleeve 68 with the fluid pressure passage through the coupling.

Grooves 108, 110, having, respectively, axially spaced radial walls 112, 114, and 118, 120 interconnected by axially extending walls 116, 122, and extending circumferentially around the inner and outer periphery of flange 100, contain sealing rings 130, 132, sealing ring 130, in groove 108, extending circumferentially around and in sliding, sealing contact with the outer wall of conduit 4 and sealing ring 132, in groove 110, extending circumferentially around and in sliding, sealing contact with the inner wall of sleeve 68. Resilient O rings 134, 136, in grooves 108, 110, respectively, apply a resilient force to the back of sealing rings 130, 132 and a fluid-tight seal behind the rings, as later described.

As best shown in FIGURES 2, 3, 4 and 5, sealing rings 90, 130 and 132, are each provided with axially spaced grooves extending circumferentially around the sealing face of the respective rings, forming, on the sealing face, a plurality of axially spaced lands in sliding contact with the outer wall of conduit 2, the outer wall of conduit 4 and the inner wall of sleeve 68, respectively. The land at the end of sealing rings 90, 130, 132 which, from the later description, is the downstream end of the respective seals, is continuous, that is, such land extends continuously and uninterrupted around the circumference of the sealing ring, forming a continuous seal between the ring and the opposing wall, in sliding contact with the wall. The remaining lands are discontinuous, that is, axially extending grooves extend across the face of the remaining lands, interconnecting the circumferential grooves, therebetween, with the fluid under pressure at the upstream end of the seals. Two such axially extending grooves, spaced at approximately 180°, are shown but one is sufficient, or if desired, additional axially spaced grooves may be employed.

The materials used to make the parts which are in sliding contact with each other should be chosen with particular care. Conduits 2, 4, sleeve 68, and ball 12 may be made of any conventional material which is compatible with the system environment. However, it has been found that to obtain long life, minimum fluid leakage, and maximum flexibility, at high internal coupling pressures, especially under vibratory conditions, a hard, polished, non-porous surface is necessary.

One type of material that has been found particularly useful in the making of sealing rings 42, 44, 90, 130, 132 for high pressure applications is the TFE (tetrafluoroethylene)-filled acetal resin molded thermoplastics. These materials combine the acetal resin base material characteristics of high strength and stiffness combined with toughness and resilience over a wide temperature range, good dimensional stability in the presence of moisture, high heat distortion temperature, excellent resistance to all types of organic solvents, and good abrasion resistance, with the excellent low friction characteristics of the TFE resin filler material. At the present time, the two best known materials of this type are produced by E. I. du Pont de Nemours & Co., Wilmington, Delaware, k under the designations "Delrin AF fiber resin DE–588" and "Delrin AF fiber resin DE–313," the two materials being composed of different grades of acetal base resins filled with TFE fibers, 22% by weight, uniformly dispersed and randomly oriented in the base resin.

In assembling the coupling of the instant invention, housing 24 of both ball and socket joints 6, 8 are bottomed in housings 22 to insure proper sealing and loading of the balls by the seals 42, 44 and Belleville springs 46. After assembly of the coupling, the ball joints 6, 8, are connected, by suitable couplings, to the inlet, and outlet ports to be connected. To protect the coupling from dirt, dust, grit, and similar contaminates in the atmosphere, covering 150 of treated cloth, plastic, or other flexible material, may be positioned over the coupling and connected, by clamp rings 152, 154, to the housings of ball and socket joints 6, 8, respectively.

In operation, fluid, under pressure, may pass through the coupling from the right to the left as shown in FIGURE 1, or vice versa, depending upon which end of the coupling, at the time, is connected to the pressure inlet and outlet, respectively. Fluid passage through the ports 104, 106, in conduit 2, balances the pressure in the chamber formed between the outer wall of conduit 2, the inner wall of sleeve 68 and flanges 80, 100 with the pressure in the coupling. Ports 72, 74, in sleeve 68, maintaining the pressure in chamber 76 at, or substantially close to, atmospheric pressure. As telescoping movement occurs between conduits 2, 4, ports 72, 74 and 104, 106 rebalance the respective chambers to the atmosphere and the pressure within the conduits. Similarly, passages 52 in the balls of ball and socket joints 6, 8 maintains the pressure in the chambers 50 in the ball and socket joints at the pressure in the conduits.

Fluid pressure within the conduits produce axial forces which tend to extend, or lengthen, the coupling. Fluid pressure within the chamber, formed between the outer wall of conduit 2, the inner wall of sleeve 68 and flanges 80 and 100, produce axial forces which tend to contract, or shorten, the coupling. The outer walls of conduits 2, 4 and the inner wall of sleeve 68 are sized such that these forces balance each other and there is no tendency for the coupling to extend or contract when pressurized.

As has been noted heretofore, a relatively small clearance is provided, at 81, between flange 80 and conduit 2 and, at 101 and 103, between flange 100 and conduit 4 and sleeve 68, respectively. These clearances permit freedom for telescoping movement between conduits 2, 4 and, furthermore, permit the pressure fluid, on the high pressure, or upstream, side of sealing rings 90, 130, 132, to escape into the grooves 82, 108, 110. This fluid pressure, as it enters the respective grooves, passes through the axially extending grooves in the sealing faces of sealing rings 90, 130, 132 and, hence, into the circumferentially extending grooves in the sealing faces but is prevented from escaping beyond the seals by the continuous land, at the low pressure, or downstream, end of each of the respective seals, such continuous land extending, uninterrupted, around the full circumference of the sealing face. The fluid pressure, behind the sealing rings, in grooves 82, 108, 110, forces O rings 92, 134, 136 from the full line position, shown in FIGURES 2 and 3, to the broken line position. Thus, the rings are moved from the high pressure side of the grooves to the low pressure side of the grooves, seal the grooves and, as the pressure increases, apply a resilient load to the sealing faces of sealing rings 90, 130, 132 at the end of the seals immediately over the fully extending continuous land on the respective sealing rings.

It has been discovered that the sealing forces, at any particular operating pressure, are significantly reduced with this arrangement. In addition, the forces necessary to slide the seals 42, 44, 90, 130, 132 over their mating surfaces does not increase proportionately with an increase in internal coupling pressure because the coefficient of friction, for the particular material of the seals, decreases with increasing bearing pressure. These factors are of particular importance, in the instant invention, because, together with the force balancing feature previously described, they permit the coupling to move freely with movement of the inlet or outlet in the axial direction. This freedom of axial movement, together with the rotational freedom of the two ball and socket joints, gives the inlet and outlet end of the coupling complete directional freedom of movement with respect to each other.

The terms and expressions that have been employed in the specification are used as terms of description and not of limitation, and there is no intention, in the use of such terms and expressions of excluding any equivalents of the features shown and described or portions thereof, since it is recognized that various modifications are possible within the scope of the invention claimed.

What is claimed:

1. A flexible and expandable fluid pressure coupling for interconnecting relatively movable fluid pressure inlets and outlets comprising:
   a pair of ball and socket members having fluid passages therethrough;
   means for connecting one of said members to a fluid pressure inlet and the other of said members to an outlet;
   first and second telescopically related fluid pressure conduits;
   means connecting one end of said first conduit to one of said pair of ball and socket members;
   means connecting one end of said second conduit to the other of said pair of ball and socket members, said first conduit at its end opposite said connected end telescoping over the end of said second conduit;
   a sleeve connected at one of its ends to said second conduit and extending axially, in spaced relationship, along the outer wall of said second conduit, over the telescoped ends of said first and second conduits, and along said first conduit forming, with the outer walls of said conduits, a fluid pressure chamber around said conduits and said telescoped ends;
   a flange on said sleeve extending inwardly toward said first conduit;
   a radial groove in said flange extending circumferentially around said flange and said first conduit;
   an axially extending wall in said groove;
   a sealing ring in said groove;
   resilient means in said groove intermediate said axially extending wall and said sealing ring;
   a flange on the telescoping end of said first conduit extending inwardly toward said second conduit and outwardly toward said sleeve;
   a first radial groove in said first conduit flange;
   a second radial groove in said first conduit flange;
   an axially extending wall in each of said first and second grooves, said first and second grooves extending circumferentially around said first conduit flange, said second conduit and the inner wall of said sleeve;
   a sealing ring in each of said first and said second grooves;
   resilient means in each of said first and second grooves intermediate said axially extending wall and said sealing ring in each of said grooves, said sealing rings and said resilient means in said grooves in said sleeve flange and said first conduit flange forming sliding, fluid-tight, seals between said sleeve and said first conduit and between said first conduit, said sleeve and said second conduit, respectively;
   a fluid port through the wall of said first conduit adjacent the flange end of said first conduit interconnecting the fluid passage in said conduit with the fluid chamber between said first conduit and said sleeve; and
   a fluid port through the wall of said sleeve adjacent the end of said sleeve connected to said second conduit, said port through said sleeve wall interconnecting the fluid chamber between said second conduit and said sleeve with the atmosphere.

2. A flexible and expandable fluid pressure coupling, as recited in claim 1, in which said sealing rings are each provided with:
   a plurality of radial grooves extending circumferentially around the sealing face of said sealing rings forming, between said grooves;
   a plurality of axially spaced lands; and
   at least one axially extending groove interconnecting said radial grooves and extending axially across said lands from the high pressure end of said rings and terminating in one of said radial grooves spaced axially on said ring from the low pressure end of said ring so that at least one of said lands at the low pressure end of said ring extends continuously around said ring.

3. A flexible and expandable fluid pressure coupling, as recited in claim 2, in which said sealing rings are of a molded thermoplastic acetal resin filled with particles of a long-chain synthetic polymer containing tetrafluorethylene.

4. A flexible and expandable fluid pressure coupling, as recited in claim 3, in which the partial content of each of said sealing rings in 22%, by weight, of the total weight of the sealing ring.

5. A fluid pressure seal for a flexible and expandable fluid pressure coupling having:
   a first conduit and a second conduit, said first conduit telescoping into said second conduit;
   a radial groove extending circumferentially around one of said conduits with its open end facing the other of said conduits; and
   a sealing ring in said groove, said sealing ring having a plurality of radial grooves extending circumferentially around the sealing face of said sealing ring forming, on said sealing face between said grooves, a plurality of axially spaced lands, and at least one axially extending groove interconnecting said radial grooves and extending axially across said lands, from the high pressure end of said ring, and terminating in one of said radial grooves spaced axially on said ring from the low pressure end of said ring, at least one of said lands, at the low pressure end of said ring, extending continuously around said ring.

6. A fluid pressure seal for a flexible and expandable fluid pressure coupling, as recited in claim 5, in which said sealing ring is of a molded, thermoplastic acetal resin filled with particles of a long-chain synthetic polymer containing tetrafluorethylene.

7. A fluid pressure seal for a flexible and expandable fluid pressure coupling, as recited in claim 6, in which the particle content of said sealing ring is 22%, by weight, of the total weight of said ring.

8. A fluid pressure seal comprising:
   a sealing ring;

a plurality of radial grooves extending circumferentially around the sealing face of said sealing ring forming, on said sealing face between said grooves, a plurality of axially spaced lands; and at least one axially extending groove interconnecting said radial grooves and extending axially across said lands from the high pressure end of said ring and terminating in one of said radial grooves spaced axially on said ring from the low pressure end of said ring, at least one of said lands, at the low pressure end of said ring, extending continuously around said ring.

9. A fluid pressure seal as recited in claim 8, in which said sealing ring is of a molded thermoplastic acetal resin filled with particles of a long-chain synthetic polymer containing tetrafluorethylene.

10. A fluid pressure seal as recited in claim 9, in which the particle content of said sealing ring is 22%, by weight, of the total weight of said ring.

References Cited

UNITED STATES PATENTS

| 1,385,613 | 7/1921 | Gill. |
| 2,421,691 | 6/1947 | Gibson et al. |
| 2,520,501 | 8/1950 | Guiler et al. |
| 3,011,803 | 12/1961 | Buckner et al. |
| 3,268,235 | 8/1966 | Jacobellis. |
| 3,306,636 | 2/1967 | Hereth |
| 3,300,225 | 1/1967 | Shepler |

FOREIGN PATENTS

| 254,467 | 7/1926 | Great Britain. |
| 1,020,699 | 2/1966 | Great Britain. |

CARL W. TOMLIN, *Primary Examiner.*

D. W. AROLA, *Assistant Examiner.*

U.S. Cl. X.R.

285—45, 95, 261, 302, 348; 277—208, 165, 177